F. G. KLECKLER.
BELT SHIFTER.
APPLICATION FILED NOV. 14, 1919.
1,354,406.
Patented Sept. 28, 1920.
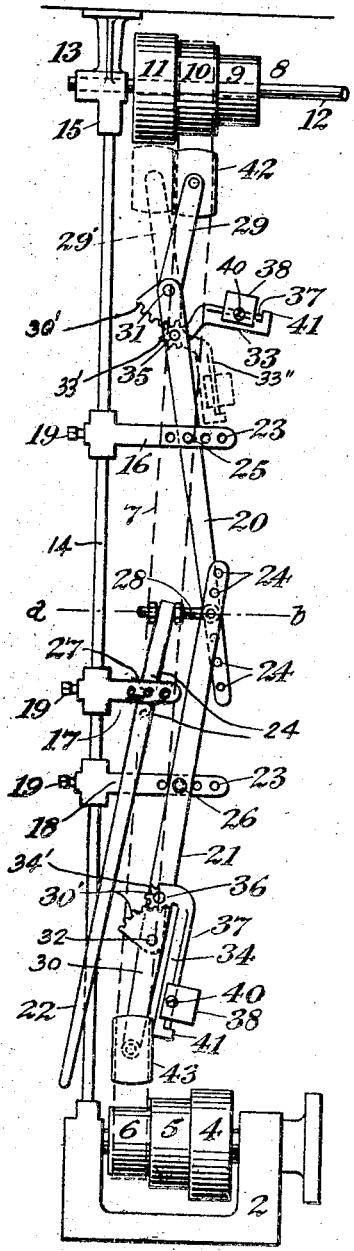
Fig. 1
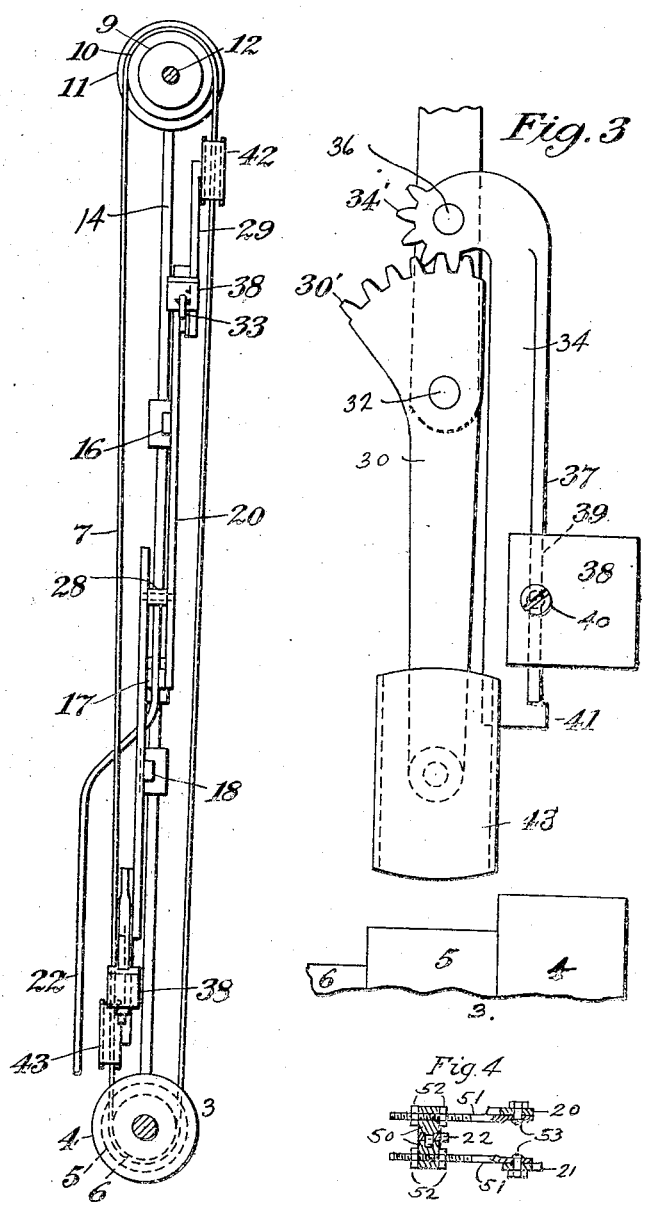
Fig. 2
Fig. 3
Fig. 4
INVENTOR
Frank G. Kleckler
BY
R. Champion
ATTORNEY

UNITED STATES PATENT OFFICE.

FRANK G. KLECKLER, OF BATH, NEW YORK.

BELT-SHIFTER.

1,354,406.  Specification of Letters Patent.  Patented Sept. 28, 1920.

Application filed November 14, 1919. Serial No. 337,964.

*To all whom it may concern:*

Be it known that I, FRANK G. KLECKLER, a citizen of the United States, and a resident of Bath, in the county of Steuben and State of New York, have invented certain new and useful Improvements in Belt-Shifters, of which the following is a specification.

This invention relates to improvements in belt shifters, and more particularly to a device of this character especially adapted for shifting a belt from step to step in either direction on coöperating cone-pulleys, and in which the actuation of the device by manual means will shift the belt from a higher to a lower step on either pulley desired and immediately thereupon will automatically and yieldingly shift the belt upon the coöperating pulley from a lower to a higher step, the present invention being in the nature of an improvement upon that shown and described in my prior Patent No. 1,293,472, granted Feb. 4, 1919.

The main object of the present invention, like that of the device of my patent before referred to, is the provision of a device of this class especially adapted for easy and efficient shifting of a belt on coöperating cone-pulleys to increase or decrease the speed of rotation of the shaft of a machine tool; the manual actuation of the device, whether it be desired to increase or decrease speed, serving first positively to shift the belt a step downward on that one of the two pulleys having its lower steps in the desired direction of movement, and at the same time exerting the same degree of force at the other pulley to shift the belt thereon. Supplementary accelerating means designed to hasten and quickly effect shifting to the higher step on said second pulley will come into action immediately the belt has been dropped the desired step on the first pulley, this means of operation producing a smooth, continuous movement of the belt without undue slacking thereof and consequent slowing down of the machine, even where it is desired to change from the highest to the lowest speed, or the reverse, on a machine having pulleys of more than two steps.

Another main object of the invention is the provision of improved means for effecting the supplementary or accelerating action by means of which a belt is moved toward and onto a higher step of a cone-pulley immediately after its movement from a higher to a lower step on the coöperating pulley has been accomplished. The means employed herein for effecting this accelerating action is shown in the form of a weighted pendulum section pivoted to the outer end of each of a pair of belt-actuating levers, said weighted members having gear-teeth at their pivot ends meshing with gear-teeth on the inner ends of weighted levers adapted to exert pressure upon the belt at that pulley on which the move is to be made from a lower to a higher step, said pressure being a gradually increasing one up to the completion of the shifting of the belt.

Another important feature is the provision of belt-engaging and directing loops on the accelerating means, these loops being pivoted on the outer ends of said arms and thereby adapted to rock on said arms and keep their inclosing sides in parallelism with the moving belt at all angles of movement, thus allowing a steady and yielding pressure on the edges of the belt and preventing roughening or wearing of the belt material.

These and other important objects of the invention not hereinbefore referred to will be hereinafter described and claimed, and are illustrated in the accompanying drawing, in which—

Figure 1 is a side elevation of my improved device in coöperative relation with a pair of cone-pulleys, one on a driving shaft and the other on the shaft of a machine to be driven;

Fig. 2 is an end view of the same, and

Fig. 3 is an elevation showing on an enlarged scale the improved supplementary means for accelerating the movement of the belt from a lower to a higher step after completion of the shift on the coöperating pulley.

Fig. 4 is a detail sectional view taken in line *a—b*, Fig. 1.

Referring to the drawings, 2 designates a portion of a lathe-head having upon its driven shaft a three-step cone-pulley, designated generally by 3, the steps being shown at 4, 5 and 6. A belt 7 is here shown connecting the cone-pulley 3 with a coöperating cone-pulley 8, the steps of which are shown at 9, 10 and 11, said pulley 8 being secured on a countershaft 12, supported in hangers 13. Though the pulleys shown herein are of three steps, permitting but three speeds of the machine, it will of course be understood that cone-pulleys of any number of steps may by means of my device have their belts shifted in either direction with equal ease and smoothness, and this whether broad or narrow belts are used or whether the belt runs in a vertical, horizontal or oblique direction. To support my device a guide-rod 14 is shown secured at one end to a bracket 15 on the hanger 13 and at the other end to the lathe-head 2. Mounted to slide on the rod 14 are three lateral arms 16, 17 and 18, set-screws 19 being shown for securing them in any desired positions. Pivoted on the rigid lateral arms 16, 17 and 18 are levers 20, 21 and 22, the former two being main shifting levers for the upper and lower pulleys respectively and 22 being a manually-operated lever for actuating the belt-shifting levers 20 and 21. The lateral arms 16, 17 and 18 are herein shown as provided with bolt-openings 23 adapted to coöperate with bolt-openings 24 in the levers 20, 21 and 22, to permit adjustment of said levers for any required length of throw of the belt-shifting devices. As here shown the lever 20 is pivoted at 25 on the rigid arm 16, while the lever 21 is pivoted on the arm 18 at 26. The manual operating lever 22 has its fulcrum at 27 on the arm 17, and has a pivoted connection, herein designated generally by 28, the lever 22 being shown as provided with opposite heads 50 pivoted thereto coaxially. These heads are provided with bolt openings therethrough for receiving the threaded ends of suitable bolts 51 which are rigidly secured thereto by nuts 52 to enable them to be adjusted, the free ends of said bolts being pivotally connected by rivets 53 to the respective levers 20 and 21 at points substantially coincident with their points of intersection so that when the lever 22 is operated motion will be transmitted to both levers 20 and 21 simultaneously in the same direction.

Coming now to the special means employed for shifting smoothly and quickly from a lower to a higher step on a pulley after the belt has been shifted on the coöperating pulley from a higher to a lower step, I have shown herein toothed auxiliary members 29 and 30, pivoted to the outer ends of the shifting levers 20 and 21 at 31 and 32, the gear-teeth being designated by 30'. Weighted arms 33 and 34, pivoted on the levers 20 and 21 at 35 and 36, and having gear-teeth 33' and 34' on their inner ends meshing with the teeth 30' of the arms 29 and 30, are so disposed as to exert a predetermined accelerating pull on said arms to direct and move a belt to a higher step when said belt has been shifted on the other pulley one step lower. This accelerating pull is a variable one, increasing gradually as the force exerted by the main operating lever increases, and reaching its maximum with the weighted arm at a right angle to said actuating lever when said belt is being moved onto the higher step. When this shift has been accomplished the weighted arm returns to its inoperative position in line with the main lever. As here shown each of the weighted toothed arms 33 and 34 has a flange 37 on which a weight 38 moves, said weight being grooved at 39 and adapted to move along the guide 37 to vary as desired the pull exerted. Set-screws 40 are shown for holding said weights in any desired positions on the arms 29 and 30, and stops 41 on the ends of said arms prevent the weights from becoming detached from the arms. The pivoted or lever sections 29 and 30 and their actuating meshing arms 33 and 34 are so positioned and weighted as to permit movement of the arms 29 and 30 from their inactive position in line with the main operating lever to a position in which they exert their greatest force on the belt, the meshing arms 33 and 34 at that time being at right angles to the respective main levers 20 and 21 for maximum thrust on the belt to move it from a lower to a higher step. The belt-encircling loops or sleeves 42 and 43 are pivoted on the lower ends of the arms 29 and 30 to permit rocking of said loops to accommodate their positions to that of the belt at all times. This assures perfectly free movement of the belt within the loops in all positions and prevents friction and wear on the belt edges.

The action of the mechanism is as follows: The belt being on the pulleys 5 and 10 for intermediate speed and it being desired to raise to the next higher speed, the manual lever 22 is moved to the left, this action resulting in the operation of the shifting-levers 20 and 21 and putting a pull on the belt near each pulley that tends to move said belt to the left at both pulleys. The force exerted on the lever 21 serving to hold the accelerating arm 30 rigid and in line with its main lever 21, the belt is slid off the pulley 5 and onto the pulley 6. Coincidently the force exerted on the lever 20 tends to unship the belt and force it from the face 10 to the next higher face 11. This being impossible until the completion of movement from 5 to 6 the arm 29 is kept temporarily in line with the face 10 though the main lever 20 has moved to exert force to set the belt to the next step. The result is the gradual actuation of the weighted arm 23 to its active or pulling position with respect to said main lever, wherein it tends to force the belt to the face 11, and said belt thereupon begins its movement onto the face 11—said weighted arm having now reached the position for exerting its maximum force—and completes its movement thereto immediately after the unshipping of the lower end of the belt from the face 5. With the belt running on the desired faces 6 and 11, the lever 29 has arrived at the position shown in dotted lines at 29′ and its weighted arm has moved to the position shown in dotted lines at 33, these being their inactive positions, in which they exert no accelerating force on the belt. It will be clear that if a change is again desired from this high speed to a lower speed the manual level will be pulled to the right to carry the upper end of the belt onto the face 10, causing lever 21 to tend to shift the lower run of the belt from 6 to 5, the higher step on the pulley preventing this until the actual drop of the belt to the lower face on upper pulley. The weighted arm 34 is now forced outward and immediately upon completion of unshipping at the upper pulley moves the belt onto the face 6, as desired, the sleeve 43 at all times having its sides parallel with the edges of the belt, thus assuring smooth movement of the belt therein and preventing wear on the belt material.

What I claim is:

1. The combination with a pair of cone-pulleys, of a belt connecting said pulleys, a belt-shifting lever for each of said pulleys, a manually-operated lever for actuating said belt-shifting levers, a supplementary belt-shifting member pivoted on each of said main shifting levers and having gear-teeth near its pivot, and a weighted arm pivoted on each main shifting lever and having gear-teeth adapted to mesh with the teeth of said supplementary member to actuate said member and shift the belt to a higher step after the actuating lever has shifted the belt to a lower step on the other pulley.

2. The combination with a pair of cone-pulleys, of a belt connecting said pulleys, a belt-shifting lever for each of said pulleys, a manually-operated lever for actuating said belt-shifting levers, a supplementary belt-shifting member pivoted on each of said main shifting levers and having gear-teeth near its pivot, and a weighted arm pivoted on each main shifting lever and having gear-teeth adapted to mesh with the teeth of said supplementary member to actuate said member and shift the belt to a higher step after the actuating lever has shifted the belt to a lower step on the other pulley, said weighted arm having movable weights slidable toward and away from said geared connection to lessen or increase the force exerted to shift the belt.

3. The combination with a pair of cone-pulleys, of a belt connecting said pulleys, a belt-shifting lever for each of said pulleys, a manually-actuated lever for controlling said belt-shifting levers, a supplementary belt-shifting member pivoted on each of said main shifting levers and having gear-teeth near its pivot, a weighted arm pivoted on each main shifting lever and having gear-teeth adapted to mesh with the teeth of said supplementary member to actuate said member and shift the belt to a higher step after the actuating lever has shifted the belt to a lower step on the other pulley, said weighted arm having movable weights slidable toward and away from said geared connection to lessen or increase the force exerted to shift the belt, and a belt-inclosing sleeve pivoted on the outer end of each supplementary belt-shifting member and adapted to yieldingly inclose and direct said belt in all its positions.

Signed at Savona, in the county of Steuben and State of New York, this 29th day of October, A. D. 1919.

FRANK G. KLECKLER.

Witnesses:
J. F. STINSON,
P. J. BUCKMASTER.